United States Patent
Mori

(10) Patent No.: US 9,473,660 B2
(45) Date of Patent: Oct. 18, 2016

(54) INFORMATION PROCESSING APPARATUS, IMAGE FORMING APPARATUS, AND NON-TRANSITORY COMPUTER READABLE MEDIUM

(71) Applicant: FUJI XEROX CO., LTD., Tokyo (JP)

(72) Inventor: Kenji Mori, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/277,482

(22) Filed: May 14, 2014

(65) Prior Publication Data

US 2015/0131112 A1 May 14, 2015

(30) Foreign Application Priority Data

Nov. 12, 2013 (JP) .................................. 2013-234369

(51) Int. Cl.
  *G06F 15/00* (2006.01)
  *H04N 1/00* (2006.01)
  *H04N 1/60* (2006.01)
(52) U.S. Cl.
  CPC ............ *H04N 1/00915* (2013.01); *H04N 1/60* (2013.01)
(58) Field of Classification Search
  None
  See application file for complete search history.

(56) References Cited

U.S. PATENT DOCUMENTS

| | | | |
|---|---|---|---|
| 2002/0105665 A1* | 8/2002 | Wasilewski et al. | 358/1.13 |
| 2007/0299911 A1* | 12/2007 | Mizunashi et al. | 709/204 |
| 2012/0069041 A1* | 3/2012 | Kitagawara et al. | 345/589 |
| 2013/0100482 A1* | 4/2013 | Liu et al. | 358/1.15 |
| 2014/0016147 A1* | 1/2014 | Hobbs | G06T 11/60 358/1.9 |
| 2014/0214806 A1* | 7/2014 | Sakata | 707/722 |
| 2014/0253937 A1* | 9/2014 | Fujishita | 358/1.13 |
| 2015/0033307 A1* | 1/2015 | Ishikura | 726/7 |
| 2015/0085308 A1* | 3/2015 | Okabayashi | H04N 1/00411 358/1.13 |

FOREIGN PATENT DOCUMENTS

| | | |
|---|---|---|
| JP | A-2006-130779 | 5/2006 |
| JP | A-2012-68458 | 4/2012 |

* cited by examiner

*Primary Examiner* — Helen Q Zong
(74) *Attorney, Agent, or Firm* — Oliff PLC

(57) ABSTRACT

An information processing apparatus includes a determination unit and an adjustment unit. The determination unit determines a rating item for which a degree of interest of a user is high among plural rating items set for an image to be formed. The adjustment unit sets a standard for the rating item determined by the determination unit among the plural rating items and performs an adjustment process such that the standard is satisfied, the rating item being the rating item for which the degree of interest of the user is high.

6 Claims, 11 Drawing Sheets

FIG. 2A

| | WEB BROWSING LEVEL | ADJUSTMENT FREQUENCY | PROFILE GENERATION | JOB HOLDING SETTING | MAGNIFICATION |
|---|---|---|---|---|---|
| COLOR DIFFERENCE FROM TARGET | 5 | 5 | 5 | — | 0.87 |
| COLOR DIFFERENCE BETWEEN DEVICES | 1 | 5 | — | — | 0.60 |
| COLOR CHANGE OVER TIME | 1 | 5 | — | 5 | 0.73 |

FIG. 2B

MAGNIFICATION = (SUM OF RATING RESULTS)/(SUM OF MAXIMUM VALUES OF BASIC MANAGEMENT ITEMS) ... (EQ. 1)

FIG. 2C

DEGREE OF PRIORITY = (MAGNIFICATION OF COLOR RATING ITEM)/(MAGNIFICATION OF MOST IMPORTANT COLOR RATING ITEM) ... (EQ. 2)

FIG. 4A

| | | WEB BROWSING LEVEL | ADJUSTMENT FREQUENCY | PROFILE GENERATION | JOB HOLDING SETTING | MAGNIFICATION | INFORMATION COLLECTION FREQUENCY | INFORMATION COLLECTION CONTENT |
|---|---|---|---|---|---|---|---|---|
| COLOR RATING ITEM | COLOR DIFFERENCE FROM TARGET | 5 | 5 | 5 | — | 0.78 | EVERY DAY | DETAILS |
| | COLOR DIFFERENCE BETWEEN DEVICES | 1 | 5 | — | — | | | |
| | COLOR CHANGE OVER TIME | 1 | 5 | — | 5 | | | |
| REGISTRATION RATING ITEM | LEAD EDGE/ SIDE EDGE REGISTRATION | 1 | 1 | — | — | 0.30 | 1 TIME/MONTH | MINIMUM |
| | COLOR REGISTRATION | 1 | 3 | — | — | | | |
| UNEVENNESS RATING ITEM | IN-PLANE UNEVENNESS | 5 | 3 | — | — | 0.80 | EVERY DAY | DETAILS |

FIG. 4B

| MAGNIFICATION | INFORMATION COLLECTION FREQUENCY | INFORMATION COLLECTION CONTENT |
|---|---|---|
| 0 TO 0.4 | 1 TIME/MONTH | MINIMUM |
| 0.4 TO 0.7 | 1 TIME/WEEK | STANDARD |
| 0.7 TO 1 | EVERY DAY | DETAILS |

FIG. 6A

| | INFORMATION | RATING |
|---|---|---|
| NUMBER OF ADMINISTRATORS | 2 PERSONS | 3 |
| COLOR MEASUREMENT MALFUNCTION FREQUENCY | 1/10 | 3 |
| COLORIMETER INFORMATION | MANUAL COLORIMETER | 5 |
| MAGNIFICATION | | 0.73 |

FIG. 6B

| | INFORMATION | RATING |
|---|---|---|
| NUMBER OF ADMINISTRATORS | 1 PERSON | 1 |
| COLOR MEASUREMENT MALFUNCTION FREQUENCY | NO HISTORY | 1 |
| COLORIMETER INFORMATION | SCANNER | 3 |
| MAGNIFICATION | | 0.33 |

FIG. 6C

| | THRESHOLD FOR MAGNIFICATION OF 1 | THRESHOLD CORRESPONDING TO FIRST DIAGNOSIS TABLE | THRESHOLD CORRESPONDING TO SECOND DIAGNOSIS TABLE | UNIT |
|---|---|---|---|---|
| TONE-CHARACTERISTICS DETERMINATION TIME | 3 | 4.1 | 9.0 | dE |
| COLOR-PHASE DETERMINATION TIME | 5 | 6.8 | 15.0 | $L^*a^*b^*$ = DISTANCE L FROM (0, 0, 0) |
| WHEN MAKING COMPARISON WITH COLOR MEASUREMENT VALUE ACQUIRED IN PAST | 5 | 6.8 | 15.0 | dE |

FIG. 6D

THRESHOLD CORRESPONDING TO MAGNIFICATION = (THRESHOLD FOR MAGNIFICATION OF 1)/(MAGNIFICATION) ... (EQ. 1)

FIG. 9A

| | | WEB BROWSING LEVEL | ADJUSTMENT FREQUENCY | PROFILE GENERATION | JOB HOLDING SETTING | MAGNIFICATION | THRESHOLD FOR MAGNIFICATION OF 1 | IN-USE DEVICE ADJUSTMENT (DEVICE ADJUSTMENT VALUE) | UPPER LIMIT VALUE | NEW THRESHOLD | RATING VALUE |
|---|---|---|---|---|---|---|---|---|---|---|---|
| COLOR RATING ITEM | COLOR DIFFERENCE FROM TARGET | 5 | 5 | 5 | — | 0.87 | 2.5 | 1.1 | 4 | 2.8 | COLOR DIFFERENCE |
| | COLOR DIFFERENCE BETWEEN DEVICES | 1 | 5 | — | — | 0.60 | 2.5 | 1.1 | 4 | 4.0 | COLOR DIFFERENCE |
| | COLOR CHANGE OVER TIME | 1 | 5 | — | 5 | 0.73 | 2.5 | 1.1 | 4 | 3.8 | COLOR DIFFERENCE |
| REGISTRATION RATING ITEM | LEAD EDGE/ SIDE EDGE REGISTRATION | 1 | 1 | — | — | 0.20 | 100 | 1 | 300 | 300 | μm |
| | COLOR REGISTRATION | 1 | 3 | — | — | 0.40 | 50 | 1 | 150 | 125 | μm |
| UNEVENNESS RATING ITEM | IN-PLANE UNEVENNESS | 5 | 3 | — | — | 0.80 | 3 | 1.3 | 5 | 4.9 | COLOR DIFFERENCE |

FIG. 9B

THRESHOLD FOR EACH RATING ITEM = (THRESHOLD FOR MAGNIFICATION OF 1)/{(MAGNIFICATION) × (DEVICE ADJUSTMENT VALUE)} ... (EQ. 1)

FIG. 11

| | SENDING OF ENGINEER | | PERFORMING OF ADJUSTMENT | | | ALARM | |
|---|---|---|---|---|---|---|---|
| | COLOR RATING ITEM | REGISTRATION RATING ITEM | UNEVENNESS RATING ITEM | COLOR RATING ITEM | REGISTRATION RATING ITEM | UNEVENNESS RATING ITEM | COLOR RATING ITEM | REGISTRATION RATING ITEM | UNEVENNESS RATING ITEM |
| THRESHOLD FOR MAGNIFICATION OF 1 | ○○ | ◇◇ | △△ | ○◇ | ◇△ | △○ | ◇○ | △◇ | ○△ |
| NEW THRESHOLD (THRESHOLD CORRESPONDING TO MAGNIFICATION) | ●● | ◆◆ | ▲▲ | ●◆ | ◆▲ | ●▲ | ●◆ | ◆▲ | ●▲ |

11A ⋯ (Sending of Engineer group)
11B ⋯ (Performing of Adjustment group)
11C ⋯ (Alarm group)

ized*US 9,473,660 B2*

INFORMATION PROCESSING APPARATUS, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-234369 filed Nov. 12, 2013.

BACKGROUND

Technical Field

The present invention relates to an information processing apparatus, an image forming apparatus, and a non-transitory computer readable medium.

SUMMARY

According to an aspect of the invention, there is provided an information processing apparatus including a determination unit and an adjustment unit. The determination unit determines a rating item for which a degree of interest of a user is high among plural rating items set for an image to be formed. The adjustment unit sets a standard for the rating item determined by the determination unit among the plural rating items and performs an adjustment process such that the standard is satisfied, the rating item being the rating item for which the degree of interest of the user is high.

BRIEF DESCRIPTION OF THE DRAWINGS

An Exemplary embodiment of the present invention will be described in detail based on the following figures, wherein:

FIGS. 2A to 2C are diagrams for describing an example of a process to be performed by the image forming system according to the present exemplary embodiment;

FIGS. 4A and 4B are diagrams for other exemplary diagnosis tables generated by a diagnosis unit;

FIGS. 6A to 6D are diagrams for other exemplary determination tables stored in the diagnosis unit;

FIGS. 9A and 9B are diagrams for another exemplary diagnosis table stored in the diagnosis unit;

FIG. 11 is a diagram for describing the threshold set for sending of an engineer, performing of adjustment, and an alarm.

DETAILED DESCRIPTION

In the following, a present exemplary embodiment of the present invention will be described with reference to attached drawings.

Figure 1:
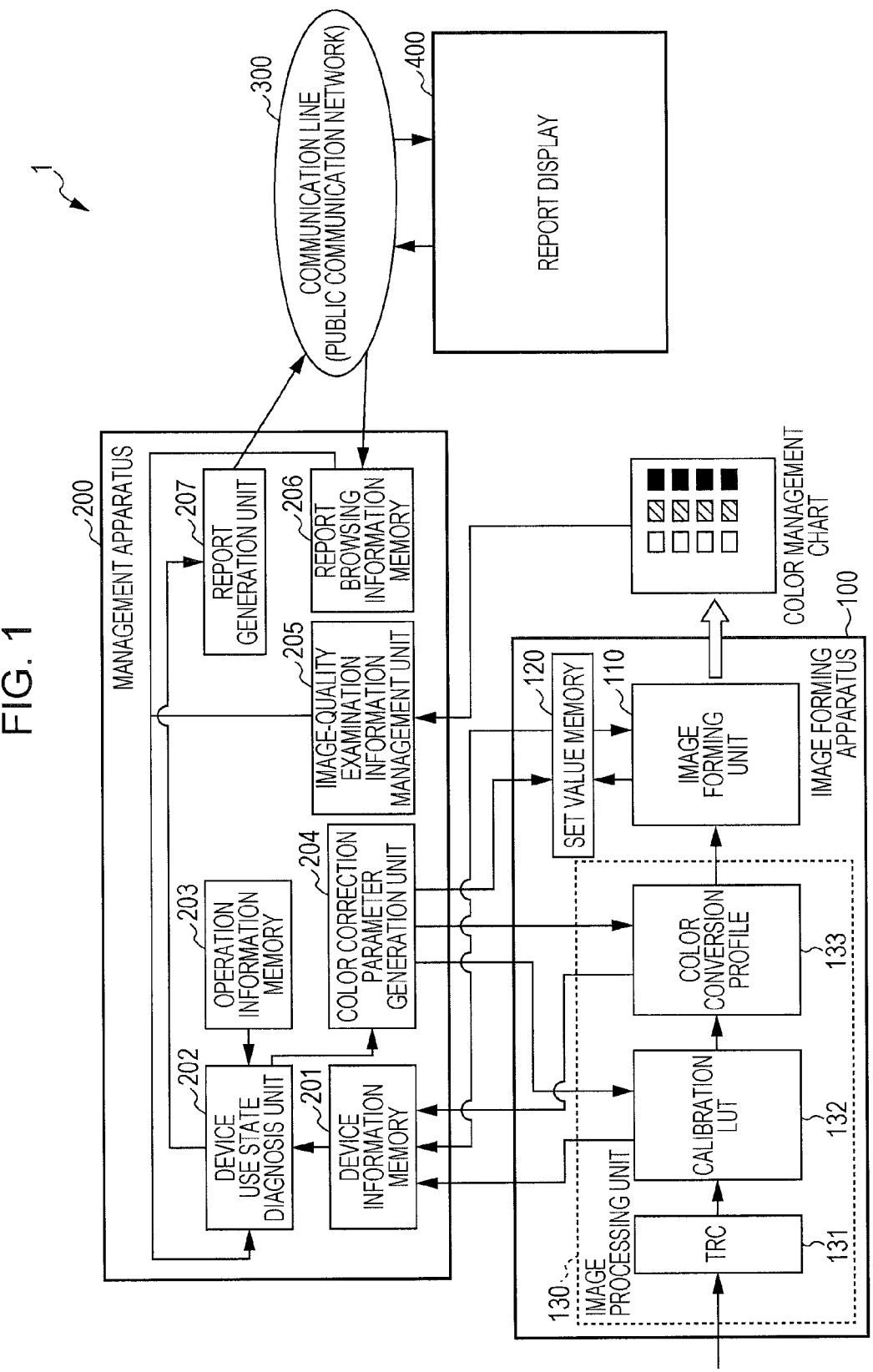
FIG. 1 is a diagram illustrating the structure of an image forming system to which a present exemplary embodiment is applied.

FIG. 1 is a diagram illustrating the structure of an image forming system to which the present exemplary embodiment is applied.

As illustrated in FIG. 1, an image forming system 1 according to the present exemplary embodiment includes an image forming apparatus 100, which forms a color image on a sheet serving as an example of a recording member. In addition, the image forming system 1 includes a management apparatus 200, which includes a personal computer (PC) and manages the image forming apparatus 100. Furthermore, the image forming system 1 includes a report display 400, which is connected to the management apparatus 200 via a communication line (a public communication line) 300. Note that the report display 400 also includes a PC.

Here, the management apparatus 200 may be provided near the image forming apparatus 100, or may also be provided on a remote site that is away from the image forming apparatus 100 and be connected to the image forming apparatus 100 and the management apparatus 200 via the communication line 300. The management apparatus 200 may also be included in the image forming apparatus 100 and may also function as one of plural functional units of the image forming apparatus 100.

The image forming apparatus 100 includes an image forming unit 110, which functions as a portion of an image forming unit. The image forming unit 110 forms an image using an electrophotographic system on a sheet, which is a recording member. Here, in the electrophotographic system, an image is formed on a sheet using a photoconductor drum, a charging device, an exposing device, a developing device, an intermediate transfer body, and the like.

In addition, the image forming apparatus 100 includes a set value memory 120, which stores set values that have been preset. The set value memory 120 stores various set values (parameters) to be used in image forming such as a developing potential. Furthermore, the image forming apparatus 100 includes an image processing unit 130, which performs preset image processing on image data transmitted from an external PC or the like and outputs image data acquired after image processing to the image forming unit 110.

The image processing unit 130 includes a first image processing unit 131 and a second image processing unit 132. The first image processing unit 131 performs tone correction using a tone reproduction curve (TRC). The second image processing unit 132 performs image processing using a calibration look up table (LUT), which is to be used in image quality adjustment (tone adjustment). Furthermore, the image processing unit 130 includes a color converter 133, which converts image data into image data of a different color space, using a color conversion profile. In the image processing unit 130, image processing is performed on input image data, using a tone reproduction curve, a calibration LUT, and a color conversion profile, and image data acquired after image processing is output to the image forming unit 110.

The management apparatus 200 serving as an example of an information processing apparatus includes a device information memory 201, a device use state diagnosis unit 202, an operation information memory 203, and a color correction parameter generation unit 204. Furthermore, the management apparatus 200 includes an image-quality examination information management unit 205, a report browsing information memory 206, and a report generation unit 207.

The device information memory 201 stores information stored in the image forming apparatus 100 such as a calibration LUT, a color conversion profile, and set values stored in the set value memory 120.

The device use state diagnosis unit 202 (hereinafter referred to as a "diagnosis unit 202") diagnoses a use state of the image forming apparatus 100 on the basis of information stored in the device information memory 201, the operation information memory 203, and the report browsing information memory 206.

The operation information memory 203 stores information on the image forming apparatus 100, a colorimeter, and the like. For example, a name of the image forming apparatus 100, the serial number of the image forming apparatus 100, an installation location of the image forming apparatus 100, types of sheets to be used by the image forming apparatus 100, the type of the colorimeter, the serial number of the colorimeter, a group name of a group that manages the image forming apparatus 100, a target color, the name of an administrator of the image forming apparatus 100 are stored.

The color correction parameter generation unit 204 generates parameters associated with color correction. Specifically, a correction parameter to be used to correct (update) the calibration LUT is generated, and a correction parameter to be used to generate a new color conversion profile is generated.

The image-quality examination information management unit 205 acquires a color measurement value acquired by reading a color management chart with the colorimeter, and outputs the color measurement value to the diagnosis unit 202. Note that a color management chart is a chart output by the image forming apparatus 100, and is a chart to be used in an examination as to whether or not an image formed by the image forming apparatus 100 satisfies preset conditions. In such a color management chart, as illustrated in FIG. 1, plural patch-shaped images of different densities and colors are formed on a sheet.

The report generation unit 207 generates a report on the basis of a diagnosis result output from the diagnosis unit 202, and transmits the report to the report display 400. Thereafter, the content of the report generated by the report generation unit 207 is displayed on the report display 400.

The report browsing information memory 206 stores a browsing history of a report and, if necessary, outputs the browsing history to the diagnosis unit 202. More specifically, in the present exemplary embodiment, a report displayed on the report display 400 is browsed by a user and history information on this browsing is transmitted from the report display 400 to the report browsing information memory 206, and then the history information is stored in the report browsing information memory 206.

Note that, functional units of the management apparatus 200 are realized by operating software and hardware resources together. Specifically, a memory such as a read-only memory (ROM) and a hard disk device stores an operating system and programs such as application software programs that operate together with the operating system and execute specific functions of the functional units.

A central processing unit (CPU) reads these programs from the ROM or the like, loads the programs into a random-access memory (RAM) serving as a main memory, and executes the programs. As a result, the functional units such as the diagnosis unit 202, the color correction parameter generation unit 204, and the report generation unit 207 are realized. In addition, the device information memory 201, the operation information memory 203, the image-quality examination information management unit 205, and the report browsing information memory 206 are realized by a memory (not illustrated) provided in the management apparatus 200.

Note that a program to be executed by the CPU may be provided in a state in which the program is stored in a computer readable recording medium such as a magnetic recording medium (a magnetic tape, a magnetic disk, and the like), an optical recording medium (an optical disc and the like), a magneto-optic recording medium, and a semiconductor memory. In addition, the program may also be downloaded into the management apparatus 200 via the communication line 300.

In the following, a process to be performed by the image forming system 1 according to the present exemplary embodiment will be described.

FIGS. 2A to 2C are diagrams for describing an example of a process to be performed by the image forming system 1 according to the present exemplary embodiment.

In the present exemplary embodiment, the diagnosis unit 202 provided in the management apparatus 200 generates a diagnosis table illustrated in FIG. 2A.

To create this diagnosis table, information on four management items displayed on the top row in FIG. 2A is collected (hereinafter each of the management items displayed on the top row in FIG. 2A is referred to as a "basic management item"). Specifically, information on "Web browsing level (browsing frequency)", "adjustment frequency", "profile generation", and "job holding setting" is collected.

In the present exemplary embodiment, for each of three rating items displayed on the leftmost column in FIG. 2A, information on "Web browsing level", "adjustment frequency", "profile generation", and "job holding setting" is collected. More specifically, for each of the three rating items, which are "color difference from target", "color difference between devices", and "color change over time" (hereinafter the three rating items are referred to as "color rating items"), information on "Web browsing level", "adjustment frequency", "profile generation", and "job holding setting" is collected.

Here, among the four basic management items described above, "Web browsing level" is information indicating which item in a report displayed on the report display 400 is browsed more frequently by a user. "Web browsing level" is rated on a scale of 1 to 5. The higher the number, the more frequently the item has been browsed. This indicates that a user has a keen interest in the item. Note that "Web browsing level" is determined by the diagnosis unit 202 on the basis of a browsing history of a report output from the report browsing information memory 206 to the diagnosis unit 202.

In the present exemplary embodiment, information on each of the three color rating items "color difference from target", "color difference between devices", and "color change over time" is gathered at the diagnosis unit 202. Next, the information gathered at the diagnosis unit 202 is output to the report generation unit 207. Thereafter, for three elements "color difference from target", "color difference between devices", and "color change over time", respective reports are generated by the report generation unit 207, and the reports are displayed on the report display 400.

Thereafter, in the present exemplary embodiment, browsing histories of (browsing information on) the reports displayed on the report display 400 are stored in the report browsing information memory 206, browsing being performed by a user. In the present exemplary embodiment, the diagnosis unit 202 determines "Web browsing level" on the basis of the browsing histories.

In addition, "adjustment frequency" among the four basic management items indicates the frequency of adjustment on a scale of 1 to 5 for each of the three elements "color difference from target", "color difference between devices", and "color change over time". The higher the number, the more frequently a user has performed adjustment. Note that "adjustment frequency" is determined by the diagnosis unit 202. As a result of determination, the diagnosis unit 202 rates "adjustment frequency" on a scale of 1 to 5. An item for which adjustment has been frequently performed is rated as "5" and an item for which adjustment has been seldom performed or has not been performed is rated as "1".

Note that adjustment for "color difference from target" is performed by updating (correcting) the calibration LUT, for example, such that the difference between a color measurement value of the color management chart (see FIG. 1) and a target color value is reduced.

In addition, adjustment for "color difference between devices" is performed by updating the calibration LUT, for example, such that the difference between a color measurement value transmitted from another device via a server apparatus that is not illustrated and a color measurement value acquired in the management apparatus 200 is reduced.

Furthermore, adjustment for "color change over time" is performed by updating the calibration LUT, for example, such that the difference between a color measurement value that is acquired from the color management chart and that is a color measurement value acquired in the past and the latest color measurement value acquired from the color management chart is reduced.

In addition, "profile generation" among the four basic management items is information indicating whether or not a profile for image processing to be used in the image processing unit 130 has been generated by a user (profiles corresponding to respective users have been generated by the users). In the case where a profile has been generated, "profile generation" is rated as "5" in the present exemplary embodiment. Here, a profile associated with "color difference from target", which is one of the color rating items, has been generated in an example illustrated in FIG. 2A. This indicates that a user has a keen interest in "color difference from target".

In addition, "job holding setting" among the four basic management items is information indicating whether or not registration of standard image data in a memory (not illustrated) has been performed by a user, the standard image data being used to determine "color change over time". In the case where registration of standard image data in a memory has been performed, "job holding setting" is rated as "5" in the present exemplary embodiment.

Here, when a color change over time is checked, the color management chart is output and color measurement is performed. Thereafter, a color measurement value acquired by color measurement is compared with a color measurement value acquired in the past. In such a case, when image data serving as the source of the color measurement chart differs every time color measurement is performed, rating may not be properly performed. In the case where "job holding setting" has been set, when it is determined whether or not a color change over time has occurred, the accuracy of determination may be improved.

In addition, for each of the three color rating items, the diagnosis unit 202 calculates a magnification indicating a keen interest or a little interest of a user for "magnification" on the basis of the above-described rating results in the present exemplary embodiment (see the rightmost column of the diagnosis table). Here, in the present exemplary embodiment, the higher the magnification, the keener interest the user has. In addition, the lower the magnification, the less interest the user has. More specifically, for each of the three color rating items, the degree of interest of a user is determined by the diagnosis unit 202, which functions as a determination unit or a first determination unit in the present exemplary embodiment. Furthermore, a color rating item is determined in which the user has the keenest interest among the three color rating items.

Note that a magnification is calculated in accordance with Equation 1 illustrated in FIG. 2B.

That is, division is performed by treating the sum of maximum values of basic management items as a denominator and the sum of rating results as a numerator, and a magnification is calculated. More specifically, for each of the three color rating items, division is performed and a magnification is calculated. As a result, the degree of interest of a user is determined for each color rating item. Note that, in FIG. 2A, although only four basic management items are illustrated, there are other basic management items that are not illustrated. Numerical values of magnifications illustrated in FIG. 2A are results acquired by performing the above-described division for the basic management items including the other basic management items that are not illustrated.

More specifically, for example, when a magnification is calculated for "color difference from target", the denominator is (5 (Web browsing level)+5 (adjustment frequency)+5 (profile generation)+5 (job holding setting)+a maximum value of another basic management item that is not illustrated). In contrast, the numerator is (5 (Web browsing level)+5 (adjustment frequency)+5 (profile generation)+0 (job holding setting)+a rating result of the other basic management item that is not illustrated). The numerator is divided by the above-described denominator and a magnification of 0.87 is acquired.

In addition, for example, when a magnification is calculated for "color difference between devices", likewise, the denominator is (5 (Web browsing level)+5 (adjustment frequency)+5 (profile generation)+5 (job holding setting)+a maximum value of the other basic management item that is not illustrated). In contrast, the numerator is (1 (Web browsing level)+5 (adjustment frequency)+0 (profile generation)+0 (job holding setting)+a rating result of the other basic management item that is not illustrated). The numerator is divided by the denominator and a magnification of 0.60 is acquired.

Furthermore, in the present exemplary embodiment, a color rating item having the highest magnification is specified as the most important color rating item by the diagnosis unit 202. In the present exemplary embodiment, for the color rating item that has been specified as the most important color rating item, a threshold (a standard) is determined (set) by the diagnosis unit 202. It is determined whether or not a condition set on the basis of the determined threshold is satisfied. As a result, a determination process as to whether or not the condition is satisfied is performed for a color rating item in which a user has a keen interest.

Figure 3:
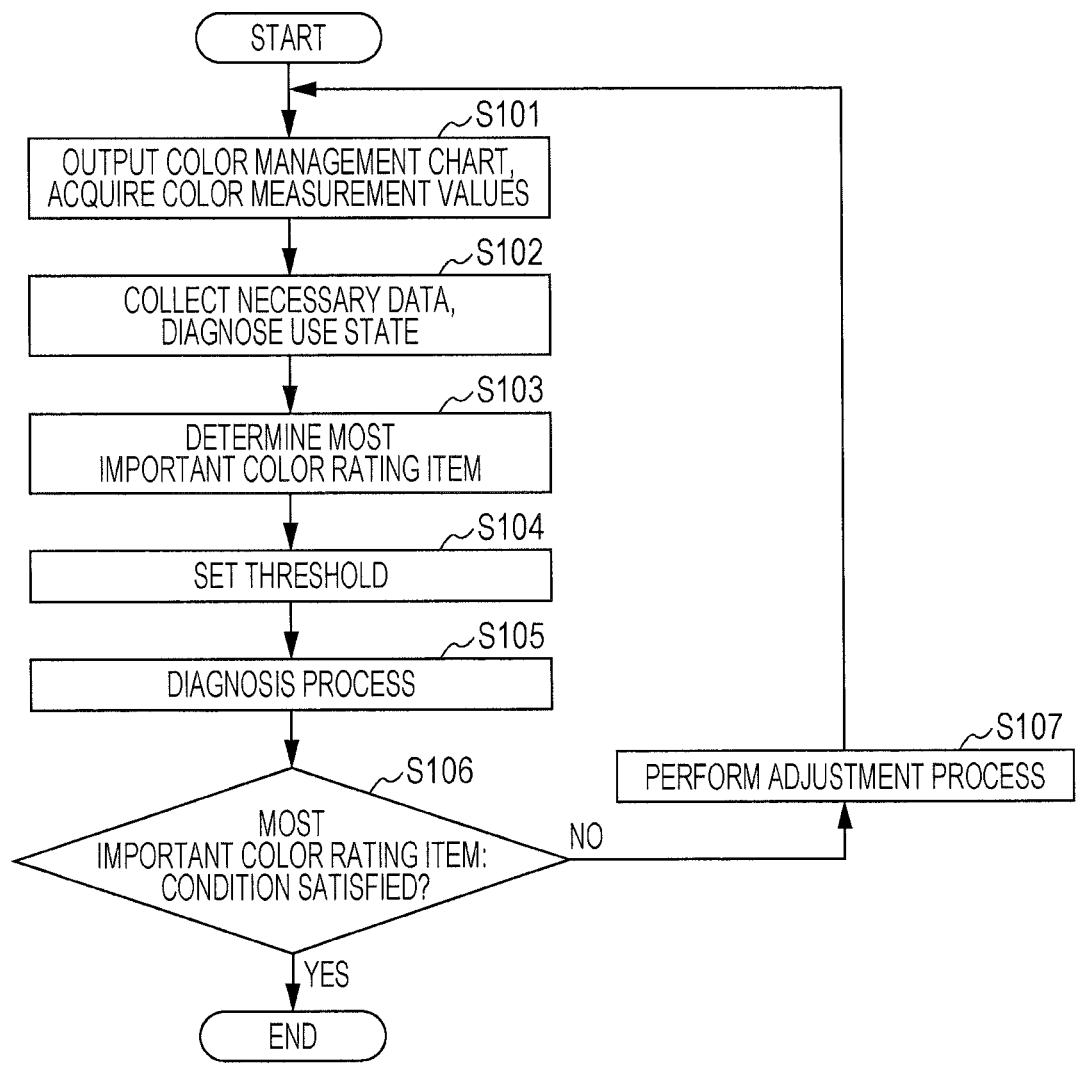
FIG. 3 is a flowchart illustrating the flow of the process described using FIGS. 2A to 2C.

Here, FIG. 3 is a flowchart illustrating the flow of the process described using FIGS. 2A to 2C.

In the present exemplary embodiment, first, the color management chart is output and then color measurement values are acquired, the color measurement value being a result acquired by reading the color management chart (step 101).

Specifically, the color management chart on which plural patch-shaped images that differ from each other in color and density are formed (see FIG. 1) is output by the image forming apparatus 100. Next, color measurement is performed using a colorimeter by a user, and color measurement values are acquired individually for the patch-shaped images. Note that, in the present exemplary embodiment, a case where a color measurement value is manually acquired using the colorimeter is described as an example; however, a scanner device may also be provided in the image forming apparatus 100 and color measurement values may also be automatically acquired.

Next, the diagnosis unit 202 collects necessary data and diagnoses a use state associated with a user (step 102). Specifically, information on the basic management items illustrated in FIG. 2A is collected for each of the color rating items. Next, magnifications are calculated on the basis of the information, a maximum value of the magnifications is determined, and the most important color rating item is determined (step 103). More specifically, a color rating item for which the degree of interest of the user is highest is determined.

Next, a threshold is set for the most important color rating item (step 104), and a diagnosis process is executed as to whether or not the most important color rating item satisfies a condition set on the basis of the threshold (steps 105 and 106).

The process from steps 104 to 106 is specifically described. For example, in the case where the most important color management item is "color difference from target", a threshold is set for "color difference from target". Next, the differences between the color measurement values acquired in step 101 and a color value preset as a target (hereinafter referred to as "color differences") are acquired. Thereafter, it is determined whether or not a preset condition for "color difference from target" is satisfied, on the basis of the acquired color differences and the threshold, which has been set as described above.

In the case where the most important color rating item satisfies the condition set on the basis of the threshold in step 106, the process ends. In contrast, in the case where the most important color rating item does not satisfy the condition set on the basis of the threshold, an adjustment process (a correction process) for satisfying the condition is performed (step 107).

A specific example of the adjustment process is described. For example, in the case where "color difference from target" is a large value and exceeds the threshold (in the case where the color difference between a color measurement value acquired in step 101 and the color value preset as the target is greater than the threshold), a correction parameter for correcting (updating) the calibration LUT is generated by the color correction parameter generation unit 204, which functions as a portion of an adjustment unit. More specifically, a correction parameter for reducing "color difference from target" is generated.

The correction parameter is transmitted to the image forming apparatus 100. Next, the correction parameter is used by the image processing unit 130 of the image forming apparatus 100 and the calibration LUT is corrected. In the following processing, the corrected calibration LUT is used and thus a color value of an image to be formed approaches the color value preset as the target.

Note that also in the case where "color difference between devices" or "color change over time" is set as the most important color management item, likewise, a condition set on the basis of a threshold is satisfied by performing the correction process on the calibration LUT.

When the correction process is performed in this manner, the correction process may affect the other color rating items and may change numerical values for the other color rating items. Here, issues tend not to arise in the case where the user does not have an interest in the other color rating items; however, issues may arise in the case where the user has a certain degree of interest in the other color rating items.

More specifically, as illustrated in FIG. 2A, the magnification for a certain color rating item is not distinctively large in the present exemplary embodiment. For example, the magnification for "color change over time" is "0.73", and it is clear that the user also has an interest in "color change over time". In such a case, when the correction process is performed as described above only for "color difference from target", in which the user has the keenest interest, "color change over time" may not satisfy a condition desired by the user.

Thus, in the case where the user also has an interest in a color rating item other than the most important color rating item, it is desirable that the above-described correction process be performed by taking into consideration the color rating item. Specifically, it is desirable that a correction process whose degree of correction does not cause a malfunction for a color rating item other than the most important color rating item be performed for the most important color rating item. More specifically, it is desirable that a threshold be set by taking into consideration effect of the correction process on a color rating item other than the color rating item in which the user has the keenest interest and the correction process be performed that satisfies a condition set on the basis of the threshold.

Note that whether or not the user also has an interest in a color rating item other than the most important color rating item is determined as follows. For example, the degree of priority is calculated in accordance with Equation 2 illustrated in FIG. 2C. In the case where, for example, the degree of priority is greater than or equal to "0.5", it is determined that the user has an interest in the color rating item other than the most important color rating item.

Note that, in the present exemplary embodiment, a threshold is basically set only for the most important color rating item in this manner and a threshold is not set for a color rating item other than the most important the most important color rating item. This is performed in order to improve the level of user satisfaction about the most important color rating item. Here, for example, if thresholds are set for all the color rating items, an adjustment process for satisfying all the color rating items is performed.

In this case, compared with the case where an adjustment process is performed only for one color rating item such as the most important color rating item, the degree of adjustment may be small for each color rating item. More specifically, in this case, since the adjustment process is performed while maintaining a balance between the color rating items in order to satisfy all the color rating items, the degree of adjustment may be small for each rating item, compared with the case where the adjustment process is performed only for one color rating item.

In addition, a user does not always have an interest in all the color rating items, and there may be a color rating item in which the user has a little interest (a color management item that is not important for the user). Under such circumstances, the level of user satisfaction tends to be improved more significantly in the case where the adjustment process is performed for a color rating item that the user thinks important than in the case where the adjustment process for satisfying all the color rating items is performed. Thus, in the present exemplary embodiment, as described above, the adjustment process is performed only for the most important color management item.

Another exemplary process to be performed by the image forming system 1 of the present exemplary embodiment will be described.

FIGS. 4A and 4B are diagrams for other exemplary diagnosis tables generated by the diagnosis unit 202.

In the above-described example, the color rating items ("color difference from target", "color difference between devices", and "color change over time") are rated; however, in the present exemplary embodiment, as illustrated in FIG. 4A, registration (alignment) rating items and an unevenness rating item are also rated. Note that the registration rating items include lead edge/side edge registration and color registration.

Here, also in the present exemplary embodiment, a magnification is calculated as illustrated in FIG. 4A in a method similar to that described above. More specifically, the diagnosis unit 202, which functions as a determination unit or a first determination unit, determines magnifications (the degrees of interest of a user) individually set for rating items which are the color rating items, the registration rating items, and the unevenness rating item. In the present exemplary embodiment, the diagnosis unit 202, which also functions as a second determination unit, determines the contents of settings to be set individually for the rating items on the basis of the magnifications (the degrees of interest) for the rating items. Specifically, an information collection frequency and information collection content are determined.

More specifically, a high information collection frequency is assigned to an item with a high magnification and for which the degree of interest of a user is high, and a setting for collecting detailed information is set. In contrast, a low information collection frequency is assigned to an item with a low magnification and for which the degree of interest of a user is low, and a setting for reducing an amount of information to be collected is set.

Furthermore more specifically, a determination table illustrated in FIG. 4B is stored in the diagnosis unit 202 and a magnification and processing content corresponding to the magnification are preset in the present exemplary embodiment. In the present exemplary embodiment, the processing content is determined in accordance with the determination table.

Specifically, for an item with a small magnification of between 0 and 0.4 and for which the degree of interest of a user is low, the information collection frequency is determined to be "1 time/month" and the information collection content is determined to be "minimum". For an item with a magnification of between 0.4 and 0.7 and in which a user has a relatively keen interest, the information collection frequency is determined to be "1 time/week" and the information collection content is determined to be "standard". For an item with a magnification of between 0.7 and 1 and in which a user has a keen interest, the information collection frequency is determined to be "every day" and the information collection content is determined to be "details". Note that, in the present exemplary embodiment, a case has been described where two elements which are the information collection content and the information collection frequency are determined on the basis of magnifications; however, only one of the two elements may also be determined.

Here, further detailed information is accumulated for items for which the degree of interest of a user is high in the present exemplary embodiment. As a result, for example, the user may be provided with further detailed information through the report display 400.

On the other hand, information is not collected so much for items for which the degree of interest of the user is low. In this case, malfunctions caused by information collection tend not to occur. An example of the malfunctions is interruption of an image forming operation. In addition, for collecting information, it may be necessary to output a color management chart. This costs a user time and trouble. In the case where information is not collected so much, the user's time and trouble are saved in comparison with a case where much information is collected.

Figure 5:
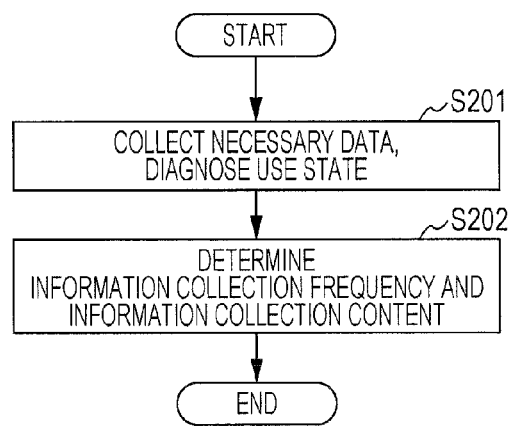
FIG. 5 is a flowchart illustrating the flow of a process described using FIGS. 4A and 4B.

FIG. 5 is a flowchart illustrating the flow of the process described using FIGS. 4A and 4B.

In the process illustrated in FIG. 5, first, necessary data is collected and a use state associated with a user is diagnosed (step 201). Specifically, information on the basic management items illustrated in FIG. 4A is collected for each of the color rating items, the registration rating items, and the unevenness rating item. Next, magnifications are calculated on the basis of the information. Next, with reference to the determination table illustrated in FIG. 4B, the information collection frequency and the information collection content are determined on the basis of the calculated magnifications (step 202).

The other example of the process will be further described.

FIGS. 6A to 6D are diagrams for other exemplary determination tables stored in the diagnosis unit 202.

In this example, as illustrated in FIG. 6A, a diagnosis table for color measurement to be performed by a user is stored in the diagnosis unit 202. In this diagnosis table, there are stored the number of administrators that manages the image forming apparatus 100 and a colorimeter, a color measurement malfunction frequency indicating a frequency at which a color measurement malfunction has been detected, and information on a colorimeter to be used in color measurement (information on an image reading device). Note that this example illustrates a case where the number of administrators is two, the color measurement malfunction frequency is once every ten measurements, and a manual colorimeter is used.

Furthermore, in this diagnosis table, the number of administrators, the color measurement malfunction frequency, and the colorimeter are each rated on a scale of 1 to 5 by the diagnosis unit 202. Furthermore, a magnification is calculated in a method similar to that described above, on the basis of rating results of the number of administrators, the color measurement malfunction frequency, and the colorimeter. Here, in this example, the number of administrators is rated as "3", the color measurement malfunction frequency is rated as "3", the colorimeter is rated as "5", and the magnification is "0.73".

Note that, in the present exemplary embodiment, an example has been described in which information on three elements which are the number of administrators, the color measurement malfunction frequency, and the colorimeter is collected; however, these three elements are a mere example. For example, information on two elements which are the color measurement malfunction frequency and the colorimeter, information on one of the three elements, or information on four or more elements may also be collected.

Note that even in the case where information on an element other than the three elements is collected, a magnification is calculated in a method similar to that described above.

Note that about the number of administrators, it is indicated that the greater a numerical value of a rating result of the number of administrators, the greater the number of administrators and the more frequently a measurement error occurs. In addition, about the color measurement malfunction frequency, it is indicated that the greater a numerical value of a rating result of the measurement malfunction frequency, the more frequently a measurement error occurs. Furthermore, about the colorimeter, it is indicated that the greater a numerical value of a rating result of the colorimeter, the more frequently a measurement error occurs. Note that, in the following description, the diagnosis table illustrated in FIG. 6A is referred to as a first diagnosis table.

FIG. 6B is a diagram illustrating a table for another image forming apparatus 100 (hereinafter referred to as a "second diagnosis table"). For the other image forming apparatus 100, the number of administrators is one and the probability of occurrence of a color measurement error is reduced, and thus the number of administrators is rated as "1". In addition, about the color measurement malfunction frequency, a color measurement error has not yet occurred ("no history" is displayed in FIG. 6B), and thus the color measurement malfunction frequency is rated as "1". Furthermore, the colorimeter is a scanner apparatus and is rated as "3". Furthermore, a magnification is "0.33" in the second diagnosis table.

Here, in this processing example, a threshold to be used to determine the presence or absence of the occurrence of a color measurement error (a threshold to be used to determine the presence or absence of the occurrence of a color measurement malfunction) is changed on the basis of the calculated magnification. Specifically, when a magnification is large and a color measurement error (a color measurement malfunction) tends to occur, the threshold is reduced so that a color measurement error is more easily detected. When a magnification is small and a color measurement error tends not to occur, the threshold is increased so that an error caused by a factor other than a color measurement error tends not to be determined to be a color measurement error. In other words, the occurrence of false detection may be reduced.

Here, the threshold is changed, for example, at a time when it is determined whether or not tone characteristics are preset tone characteristics (hereinafter the time is referred to as a "tone-characteristics determination time"). At the tone-characteristics determination time, a color management chart is output on which plural patch-shaped images whose area coverage differ from each other are formed, and color measurement is performed on each of the patch-shaped images. Thereafter, it is determined whether or not color measurement values acquired as a result of this color measurement satisfy a preset condition.

Figure 7A:
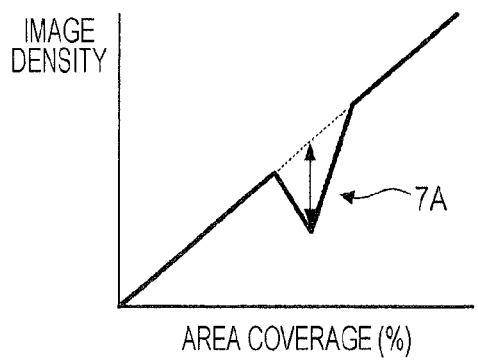
FIGS. 7A to 7C are diagrams illustrating color measurement values.

Here, the color management values acquired by reading the patch-shaped images are graphed. As illustrated in FIG. 7A (a diagram illustrating the color measurement values), usually, a graph is acquired in which a solid line trends mostly upward. On the other hand, when a color measurement error occurs, a portion of color measurement values significantly changes as indicated by a reference numeral 7A in FIG. 7A.

Here, in the present exemplary embodiment, a threshold for an amount of change in a color measurement value is set. When the amount of change exceeds the threshold (when information on a color measurement value does not satisfy a preset condition), the diagnosis unit 202, which also functions as a detection unit, determines (detects) that a color measurement error (a reading malfunction) has occurred. However, as described above, when a magnification is large and a color measurement error tends to occur, the threshold is reduced, and when a magnification is small and a color measurement error tends not to occur, the threshold is increased.

Specifically, when a color measurement error tends to occur as in the case of the above-described first diagnosis table, the threshold is set to 4.1 as illustrated in FIG. 6C. When a color measurement error tends not to occur as in the case of the above-described second diagnosis table, the threshold is set to 9.0, which is greater than 4.1, as illustrated in FIG. 6C. As a result, as described above, when a color measurement error tends to occur, the occurrence of color measurement error detection tends to increase, and when a color measurement error tends not to occur, the occurrence of false detection tends to decrease.

Note that, as illustrated in FIG. 6C in the present exemplary embodiment, a threshold for a magnification of 1 is preset, and thresholds for magnifications of other than 1 are calculated on the basis of the threshold for a magnification of 1. Specifically, calculation is performed in accordance with Equation 1 illustrated in FIG. 6D.

Note that the threshold may be changed at a time when it is determined whether or not each patch-shaped image is formed in a preset color (hereinafter the time is referred to as a "color-phase determination time"). Although variations occur to some extent in the color measurement values of the patch-shaped images formed on the color management chart, when a color measurement error does not occur, the color measurement values fall within a certain color range. Thus, when a color measurement value falls outside the certain color range, it may be considered that a color measurement error has occurred.

Figure 7B:
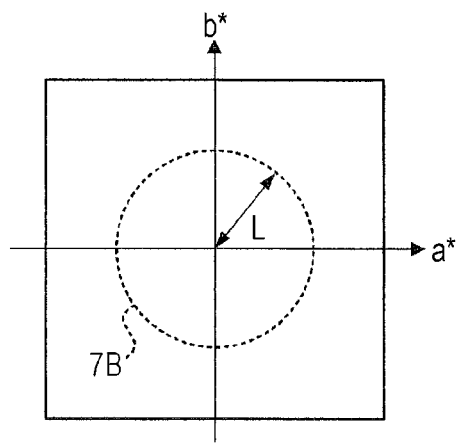

Specifically, for example, the color measurement values usually fall within an area defined by a broken line denoted by a reference numeral 7B in a color space of a Lab illustrated in FIG. 7B. When a color measurement error occurs, a color measurement value falls outside the area.

Here, also at the color-phase determination time, the threshold is changed in accordance with how frequently a color measurement error tends to occur. Specifically, a distance L from the center (0, 0) used to define the outer edge of the area (defined by the broken line denoted by the reference numeral 7B) is treated as the threshold, and the distance L is changed. More specifically, in the case of the first diagnosis table in which a color measurement error tends to occur, the distance L is set to 6.8 as illustrated in FIG. 6C, and in the case of the second diagnosis table in which a color measurement error tends not to occur, the distance L is set to 15.0, which is greater than 6.8, as illustrated in FIG. 6C. As a result, similarly to as in the above-described case, when a color measurement error tends to occur, the occurrence of color measurement error detection tends to increase, and when a color measurement error tends not to occur, the occurrence of false detection tends to decrease.

In addition, the threshold may be changed when a comparison process is performed in which a comparison is made with a color measurement value acquired in the past.

Figure 7C:
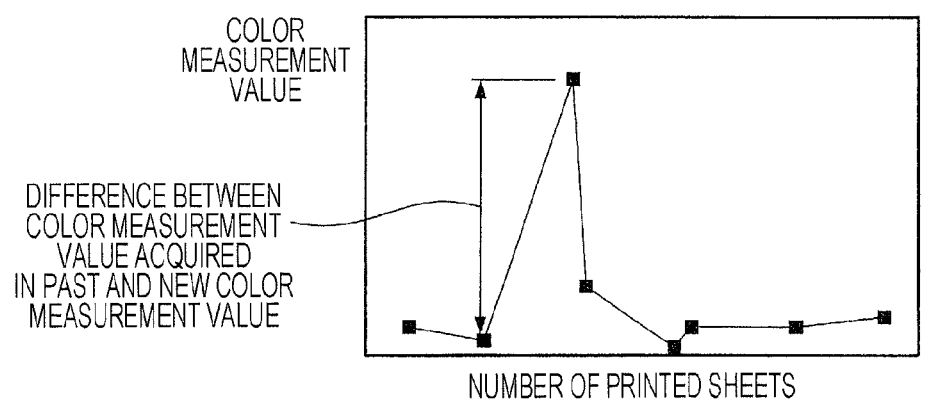

Here, a color measurement value is changed as illustrated in FIG. 7C by a change that has occurred over time in a device or the like. Note that, even when the color measurement value is changed in this manner, an amount of change of the color measurement value has a limit. When the amount of change exceeds the limit, it may be considered that a color measurement error has occurred.

Note that, when the comparison process is performed in which a comparison is made with a color measurement value acquired in the past, the color management chart is output on which the patch-shaped images are formed and, furthermore, color measurement is performed on each of the patch-shaped images and color measurement values are acquired. Every time a new color measurement value is acquired, a comparison is made with a color measurement value acquired in the past and the difference between the new color measurement value and the color measurement value acquired in the past is acquired. When the difference exceeds a preset threshold, it is determined that a color measurement error has occurred.

Here, also in this example, the threshold is changed in accordance with how frequently a color measurement error tends to occur. Specifically, with reference to FIG. 6C, in the case of the first diagnosis table in which a color measurement error tends to occur, the threshold is set to 6.8, and in the case of the second diagnosis table in which a color measurement error tends not to occur, the threshold is set to 15.0 as illustrated in FIG. 6C. As a result, similarly to as in the above-described case, when a color measurement error tends to occur, the occurrence of color measurement error detection tends to increase, and when a color measurement error tends not to occur, the occurrence of false detection tends to decrease.

Figure 8:
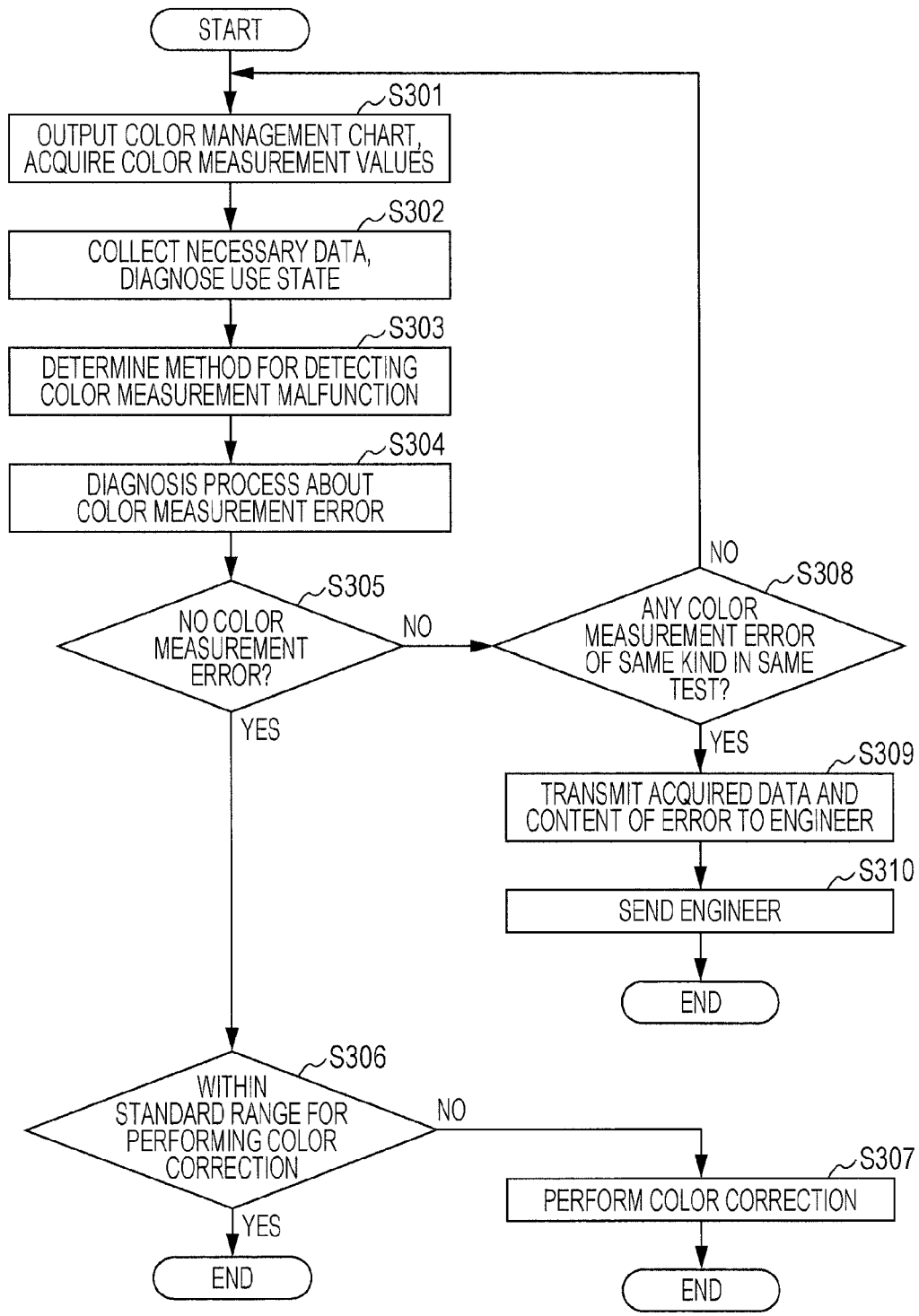
FIG. 8 is a flowchart of the flow of a process illustrated in FIGS. 6A to 7C.

FIG. 8 is a flowchart of the flow of a process illustrated in FIGS. 6A to 7C.

In the above-described process illustrated in FIGS. 6A to 7D, the color management chart is first output, and then color measurement values are acquired which are reading results of the color management chart (step 301). Specifically, the color management chart (see FIG. 1), on which plural patch-shaped images are formed that differ from each other in color and density, is output by the image forming apparatus 100. Next, color measurement is performed with a colorimeter by a user and color measurement values are acquired individually for the patch shaped images.

Next, the diagnosis unit 202 collects necessary data, and diagnoses a use state associated with a user (step 302). Specifically, the diagnosis unit 202, which also functions as an acquisition unit, acquires information on the number of administrators, the color measurement malfunction frequency, and the colorimeter illustrated in the first diagnosis table or the like, and furthermore, calculates a magnification on the basis of the information.

Next, the diagnosis unit 202 performs a confirmation process in a method for detecting a color measurement malfunction (step 303).

Specifically, the diagnosis unit 202 determines the above-described threshold to be used to determine whether or not a color measurement error has occurred. More specifically, a threshold corresponding to a magnification is determined in accordance with the threshold for a magnification of 1 stored in the table illustrated in FIG. 6C and Equation 1 illustrated in FIG. 6D. More specifically, the diagnosis unit 202, which functions as a change unit, changes, on the basis of a magnification, the threshold for a magnification of 1 to a new threshold corresponding to the magnification. Note that when there are plural determination targets such as tone-characteristics determination, color-phase determination, and comparison determination in which a comparison is made with a color measurement value acquired in the past, new thresholds are determined individually for the determination targets.

Next, the diagnosis unit 202 performs a diagnosis process as to whether or not a color measurement error has occurred (step 304 and step 305). Specifically, it is determined on the basis of the color management values acquired in step 301 and a threshold determined in step 303 whether or not a color measurement error has occurred. Note that when there are plural determination targets as described above, it is determined for each of the determination targets whether or not a color measurement error has occurred. When it is determined in step 305 that a color measurement error has not occurred, the process proceeds to step 306.

In step 306, the color measurement values acquired in step 301 fall within a range based on a preset standard (a standard as to whether or not to perform a color correction process). When the color measurement values acquired in step 301 fall within the range based on the preset standard, the process ends. In contrast, in step 306, when a color measurement value acquired in step 301 falls outside the range based on the preset standard, the color correction process is performed (step 307). Specifically, an update (correction) process is performed on the calibration LUT such that the difference between each of the color management values acquired in step 301 and a target color value is reduced.

In contrast, when it is determined in step 305 that a color measurement error has occurred, it is determined whether or not a color measurement error has occurred in the same kind of test (the same determination target) in the past and a color measurement error of the same kind has occurred in the past (step 308). When Yes in step 308, acquisition data acquired so far and the content of an error (the content of the color measurement error) are transmitted to an engineer (step 309) and an engineer is sent (step 310).

Here, in the present exemplary embodiment, in the case where it is determined in this manner that a color measurement error has occurred in the same kind of test (the same determination target) in the past and a color measurement error of the same kind has occurred in the past, an engineer is sent. That is, in the case where a color measurement error of the same kind has occurred two times, an engineer is sent. False detection may occur in detection as to whether or not a color measurement error has occurred. As in the present exemplary embodiment, the occurrence of false detection may be reduced in the case where it is determined whether or not a color measurement error of the same kind has occurred two times.

Another exemplary process will further be described.

FIGS. 9A and 9B are diagrams for another exemplary diagnosis table stored in the diagnosis unit 202.

In a process performed using a diagnosis table illustrated in FIG. 9A, a threshold (a standard to be used when each rating item is rated) is determined by taking into consideration the performance of an in-use device in addition to a magnification. More specifically, a standard to be used to determine whether or not to perform adjustment is determined by taking into consideration the performance of an in-use device in addition to a magnification.

Specifically, there are plural types of image forming apparatuses 100, and the performance differs from type to type. For example, an image forming apparatus 100 of a certain type has a lower accuracy in in-plane evenness than apparatuses of the other types and in-plane unevenness tends to occur. In such an apparatus, a threshold for detection of in-plane unevenness is reduced, and it is determined that in-plane unevenness has occurred when a value of in-plane unevenness changes even a little.

Specifically, in this exemplary process, a column of in-use device adjustment is provided as illustrated in FIG. 9A, numerical values (hereinafter referred to as "device adjustment values") corresponding to the type of an in-use device (the image forming apparatus 100) are set individually for the color rating items ("color difference from target", "color difference between devices", and "color change over time"), the registration rating items ("lead edge/side edge registration" and "color registration"), and the unevenness rating item ("in-plane unevenness"). More specifically, for each of the rating items, performance information on the image forming apparatus 100 (a value indicating the performance of the image forming apparatus 100) is preset, the performance information affecting the rating item. In the present exemplary embodiment, thresholds are determined by taking into consideration the performance information set individually for the rating items.

Note that, this example illustrates a diagnosis table for the image forming apparatus 100 having a lower accuracy in in-plane evenness than the other image forming apparatuses 100. For the in-plane unevenness, the device adjustment value is set to "1.3". More specifically, the device adjustment values for the color rating items and the registration rating items are set to "1.1" and "1", respectively; however, the device adjustment value for the in-plane unevenness is set to "1.3", which is greater than "1" and "1.1". Note that the device adjustment values are stored in the operation information memory 203 (see FIG. 1) at a stage before shipment from a factory or the like, and the diagnosis unit 202 acquires device adjustment values from the operation information memory 203 when generating a diagnosis table.

In addition, similarly to what is described above, as illustrated in FIG. 9A, a threshold for a magnification of 1 (a standard to be used when each rating item is rated) is preset in this process. For each of the rating items, which are the color rating items, the registration rating items, and the unevenness rating item, the threshold for a magnification of 1 is divided by a magnification of the rating item and a new threshold (a new standard) is set. Note that, in the present exemplary embodiment, the threshold for a magnification of 1 is not simply divided by a magnification. As illustrated in Equation 1 of FIG. 9B, the threshold for a magnification of 1 is divided by a number acquired by multiplying a certain magnification by a device adjustment value corresponding to the certain magnification and a new threshold is set.

Here, in the case where such a process is performed, for example, the threshold for a magnification of 1 is divided by a number acquired by multiplying a magnification by 1.3 in the image forming apparatus 100 having a low accuracy in in-plane evenness. As a result, an apparatus having a low accuracy in in-plane evenness has a lower threshold than an apparatus having a high accuracy in in-plane evenness (determination is performed in accordance with a stricter standard). In such a case, for the image forming apparatus 100 with which in-plane unevenness tends to occur, in-plane unevenness may be detected with a higher probability. In contrast, for the image forming apparatus 100 having a high accuracy in in-plane evenness, the occurrence of false detection may be reduced since the threshold is increased.

Another exemplary process will be further described.

Figure 10:
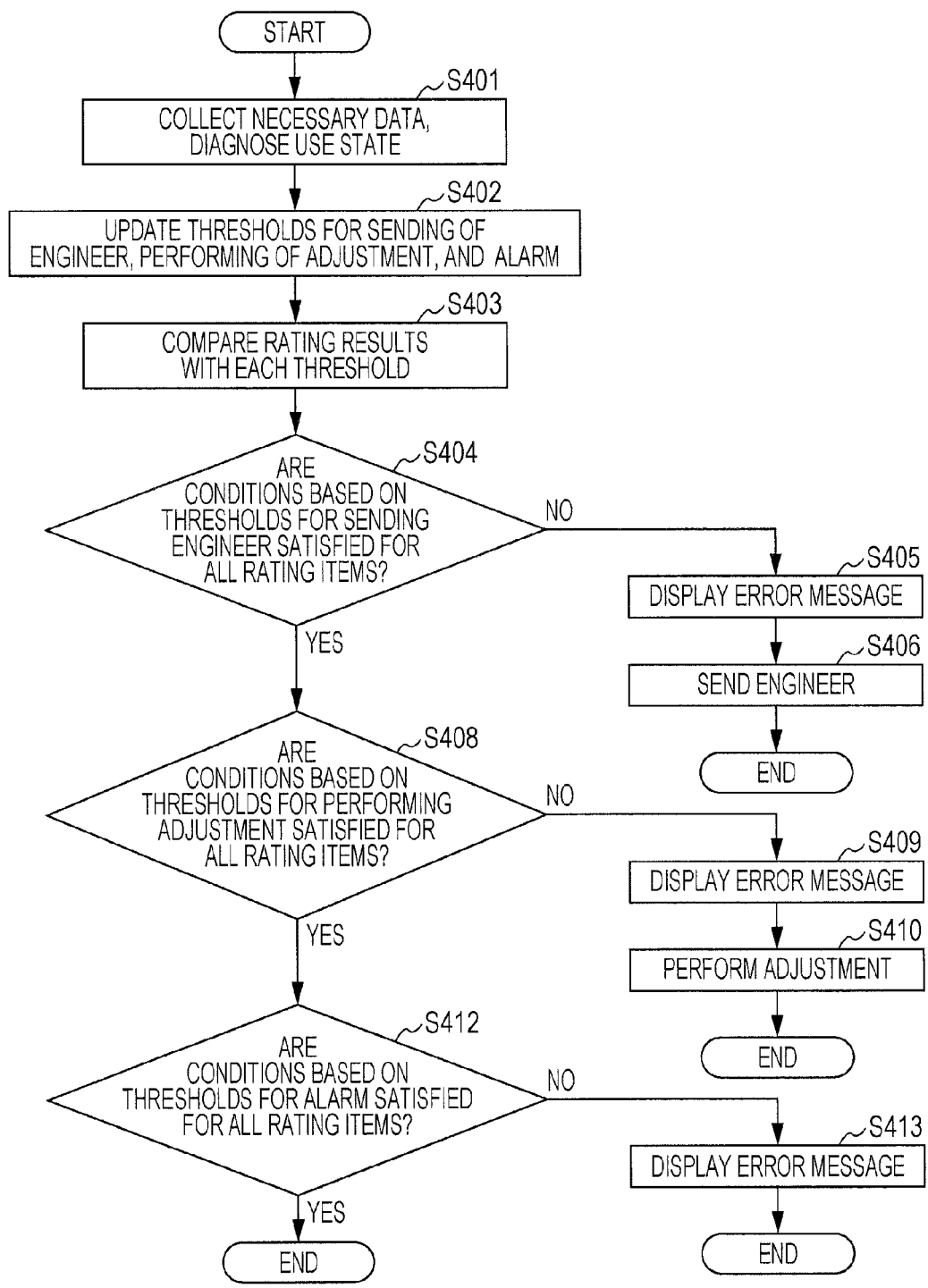
FIG. 10 is a flowchart illustrating the flow of a process in which a threshold to be used to determine whether or not to send an engineer, whether or not to perform adjustment, and whether or not to issue an alarm is determined in accordance with the degree of interest of a user.

FIG. 10 is a flowchart illustrating the flow of a process in which thresholds to be used to determine whether or not to send an engineer, whether or not to perform adjustment, and whether or not to issue an alarm are determined in accordance with the degree of interest of a user (a magnification).

Here, whether or not to send an engineer, to perform adjustment (an adjustment process for the image forming apparatus 100), and to issue an alarm may be determined by comparing read data acquired by reading the color management chart with the thresholds preset individually for a color rating item, a registration rating item, and an unevenness rating item.

In such a case, for a rating item for which the degree of interest of a user is low in the present exemplary embodiment, for example, the threshold is increased to ease conditions used to determine whether or not to send an engineer, to perform adjustment (an adjustment process for the image forming apparatus 100), or to issue an alarm. In contrast, for a rating item for which the degree of interest of a user is high, for example, the threshold is reduced to make the conditions used to determine whether or not to send an engineer, to perform adjustment (an adjustment process for the image forming apparatus 100), or to issue an alarm stricter.

Details of the process will be described with reference to FIG. 10.

In this process, similarly to what is described above, the diagnosis unit 202 first collects necessary data and diagnoses a use state associated with a user (step 401). Specifically, information on the above-described basic management items is acquired for each of the color rating item, the registration rating item, and the unevenness rating item, and rating is performed on a scale of 1 to 5 for each rating item, similarly to what is described above. Next, magnifications are calculated on the basis of rating results, similarly to what is described above. As a result, for example, a diagnosis table similar to the diagnosis table illustrated in FIG. 4A is generated. More specifically, a diagnosis table is generated that does not have the column of "information collection frequency" and the column of "information collection content" of FIG. 4A.

Next, a changing process (an update process) is performed on the thresholds by the diagnosis unit 202 (step 402). More specifically, in the present exemplary embodiment, thresholds are preset individually for three items which are sending of an engineer, performing of adjustment, and an alarm, the thresholds being standards as to whether or not to send an engineer, to perform adjustment, and to issue an alarm. In step 402, the values of the thresholds are changed on the basis of the magnifications. Specifically, as described above, for example, for a rating item for which the degree of interest of a user is high, the threshold is reduced, and for a rating item for which the degree of interest of a user is low, the threshold is increased.

More specifically, as illustrated in FIG. 11 (a diagram used to describe thresholds set for sending of an engineer, performing of adjustment, and an alarm), a determination table to be used to determine a threshold is stored in the diagnosis unit 202 in the present exemplary embodiment. In the determination table, thresholds for a magnification of 1 are preset individually for sending of an engineer, performing of adjustment, and an alarm. Furthermore, for each of sending of an engineer, performing of adjustment, and an alarm, thresholds are preset individually for the color rating item, the registration rating item, and the unevenness rating item.

In the present exemplary embodiment, the changing process is performed on the thresholds as described above. In the changing process, similarly to what is described above, for each rating item, a new threshold is calculated by dividing a threshold for a magnification of 1 corresponding to the rating item by a magnification corresponding to the rating item. As a result, for each of three processes which are sending of an engineer, performing of adjustment, and an alarm, new thresholds (new thresholds corresponding to magnifications) are set individually for the three rating items which are the color rating item, the registration rating item, and the unevenness rating item.

Next, in the present exemplary embodiment, the color management chart is output, the output color management chart is read, and read data to be used for determination regarding the color rating item, the registration rating item, and the unevenness rating item is acquired. Next, a comparison process is performed to compare the read data with the new thresholds, which are set (step 403).

It is determined in step 404 whether or not conditions set on the basis of three new thresholds (three thresholds positioned in a portion encircled by a frame 11A in FIG. 11) are satisfied, the three new thresholds being acquired as a result of performing the above-described changing process based on magnifications on three thresholds set for sending of an engineer (thresholds set individually for the color rating item, the registration rating item, and the unevenness rating item). When the conditions are satisfied, the process proceeds to step 408.

In contrast, when the conditions set on the basis of the three new thresholds are not satisfied, for example, an error message is displayed for a user through a UI (not illustrated) of the image forming apparatus 100 (step 405). Next, a process for sending an engineer is performed by performing a notification process to an engineer by using an e-mail or the like (step 406). As a result, the image forming apparatus 100 is repaired or the like by an engineer.

The process in and after step 408 will be described.

It is determined in step 408 whether or not conditions set on the basis of three new thresholds (three thresholds positioned in a portion encircled by a frame 11B in FIG. 11) are satisfied, the three new thresholds being acquired as a result of performing the above-described changing process on three thresholds set for performing of adjustment. When the conditions are satisfied, the process proceeds to step 412.

In contrast, when the conditions set on the basis of the three new thresholds are not satisfied, similarly to what is described above, for example, an error message is displayed for the user through the UI (not illustrated) of the image forming apparatus 100 (step 409). Next, a preset adjustment process is performed by the image forming apparatus 100 (step 410).

The process in and after step 412 will be described.

In the process in and after step 412, it is determined whether or not conditions set on the basis of three new thresholds (three thresholds positioned in a portion encircled by a frame 11C in FIG. 11) are satisfied, the three new thresholds being acquired as a result of performing the above-described changing process on three thresholds set for an alarm. When the conditions are satisfied, the process ends.

In contrast, when the conditions set on the basis of the three new thresholds are not satisfied, similarly to what is described above, for example, an error message is displayed for the user through the UI (not illustrated) of the image forming apparatus 100 (alarm display is performed) (step 413).

OTHERS

In the present exemplary embodiment, as described above, a new threshold is acquired by dividing a threshold for a magnification of 1 by a magnification (in the example illustrated in FIGS. 9A and 9B, a number acquired by multiplying a magnification by a device adjustment value). When a magnification is low, a threshold corresponding to the magnification becomes extremely large, and a malfunction may occur such that determination based on the threshold is not substantially performed (a malfunction may occur such that the threshold does not serve as a threshold).

Thus, an upper limit is set for a threshold. In the case where a new threshold acquired as a result of calculation using a magnification exceeds the upper limit, it is desirable that the upper limit be set as the new threshold.

Here, although description is omitted above, the diagnosis table illustrated in FIG. 9A is a diagnosis table for which an upper limit is set. In the case where a new threshold acquired as a result of calculation using a magnification exceeds the upper limit, the upper limit is set as the new threshold. More specifically, in FIG. 9A, the magnification for the lead edge/side edge registration is 0.2, and the threshold acquired as a result of calculation using the magnification is 500. For the lead edge/side edge registration, an upper limit of 300 is set, and thus the threshold is set to 300.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a hardware processor; and
a memory containing instructions adapted to be executed by the hardware processor to cause the hardware processor to act as:
a determination unit that determines a rating item for which a degree of interest of a user is high among a plurality of rating items set for an image to be formed,
wherein the plurality of rating items are color rating items, the color rating items including (i) color difference from target, (ii) color difference between devices, and (iii) color change over time; and
an adjustment unit that sets a threshold for the rating item determined by the determination unit among the plurality of rating items and that performs an adjustment process to adjust color in the image to be formed, such that a condition set on the basis of the threshold is satisfied, the rating item being the rating item for which the degree of interest of the user is high,
the determination unit determining a rating item for which the degree of interest of the user is highest among the plurality of rating items, and
the adjustment unit setting a threshold for the rating item for which the degree of interest of the user is highest and performing the adjustment process such that a condition set on the basis of the threshold is satisfied,
wherein the hardware processor is configured to output image data acquired after the adjustment process to an image forming apparatus, which forms an image on a recording member.

2. The information processing apparatus according to claim 1, wherein
the adjustment unit sets the standard by taking into consideration effect of the adjustment process on rating items other than the rating item for which the degree of interest of the user is high.

3. An information processing apparatus comprising:
a hardware processor; and
a memory containing instructions adapted to be executed by the hardware processor to cause the hardware processor to act as:
a first determination unit that determines, for each of a plurality of rating items set for an image to be formed, a degree of interest of a user,
wherein the plurality of rating items are color rating items, the color rating items including (i) color difference from target, (ii) color difference between devices, and (iii) color change over time; and
a second determination unit that determines, for each of the plurality of rating items, an information collection frequency and an information collection to be set for the rating item on the basis of the degree of interest determined by the first determination unit,
the information collection frequency indicating a frequency of collection of information,
the information collection content indicating a setting for collecting detailed or minimal information, and
the setting being based on the determined information collection frequency,
wherein the hardware processor is configured to output a report to a display, the report including information collected based on the degree of interest of the user.

4. The information processing apparatus according to claim 3, wherein
in a case where information is collected for each of the plurality of rating items, the second determination unit determines information collection content, an information collection frequency, or both.

5. The information processing apparatus according to claim 3, wherein
the second determination unit determines a standard to be used in a case where each of the plurality of rating items is rated.

6. The information processing apparatus according to claim 5, wherein
for each of the plurality of rating items, the second determination unit acquires performance information on an image forming apparatus that forms the image, the performance information affecting the rating item, and determines the standard by taking into consideration the performance information acquired for the rating item.

* * * * *